United States Patent
Rao et al.

(10) Patent No.: US 11,431,606 B2
(45) Date of Patent: Aug. 30, 2022

(54) GENERATION OF TEST TRAFFIC CONFIGURATION BASED ON REAL-WORLD TRAFFIC

(71) Applicant: VMware, Inc., Palo Alto, CA (US)

(72) Inventors: Sudarshana Kandachar Sridhara Rao, Bangalore (IN); Aravindhan K, Chennai (IN); Srinivasa Srikanth Podila, Bangalore (IN); Tathagat Priyadarshi, Bangalore (IN); Raghav Kempanna, Bangalore (IN); Rajagopal Sreenivasan, Bangalore (IN); Vipin Padmam Ramesh, Nagercoil (IN)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 17/179,113

(22) Filed: Feb. 18, 2021

(65) Prior Publication Data

US 2022/0210044 A1 Jun. 30, 2022

(30) Foreign Application Priority Data

Dec. 31, 2020 (IN) .......................... IN202041057379

(51) Int. Cl.
*H04L 43/50* (2022.01)
*H04L 41/0816* (2022.01)
*H04L 41/147* (2022.01)
*H04L 43/062* (2022.01)

(52) U.S. Cl.
CPC .......... *H04L 43/50* (2013.01); *H04L 41/0816* (2013.01); *H04L 41/147* (2013.01); *H04L 43/062* (2013.01)

(58) Field of Classification Search
CPC ... H04L 43/50; H04L 41/0816; H04L 41/147; H04L 43/062
USPC ....................................................... 709/224
See application file for complete search history.

(56) References Cited

U.S. PATENT DOCUMENTS

| 2006/0109793 | A1* | 5/2006 | Kim ...................... H04L 41/145 370/250 |
| 2019/0260663 | A1* | 8/2019 | Pueblas ............... H04L 41/0213 |
| 2020/0067788 | A1* | 2/2020 | Thakkar ............... H04L 43/0876 |

* cited by examiner

*Primary Examiner* — Nicholas R Taylor
*Assistant Examiner* — Chong G Kim
(74) *Attorney, Agent, or Firm* — Adeli LLP (57) ABSTRACT

Some embodiments provide a method for generating a test traffic configuration for testing a first network. From a second network, the method receives a set of data streams representing data traffic observed in the second network. The method uses a machine learning engine to analyze the set of data streams in order to determine traffic patterns in the second network. The method generates the test traffic configuration for testing the first network by replicating the traffic patterns of the second network in the first network.

20 Claims, 4 Drawing Sheets

GENERATION OF TEST TRAFFIC CONFIGURATION BASED ON REAL-WORLD TRAFFIC

BACKGROUND

Networking is at the heart of application delivery. Modern applications are built with the requirement of anywhere, anytime, any device, and any-scale. Most of such applications work seamlessly in an ideal world, but the behavior of these applications might differ under varying conditions due to changes in infrastructure and diverse traffic patterns. As such, in a world where the number of connected devices is increasing every day, the importance of a solid IT infrastructure is paramount and inevitable. With this rate of growth, it becomes absolutely essential to ensure the scalability and reliability of an advanced application network appliance (e.g., load balancer, virtualized network function, or other devices) that handles traffic for real-world applications.

As such, application deployments (including any load balancer devices that handle traffic for the application) are typically tested before real-world deployment, using a traffic testing tool. Most modern traffic generators are capable of performing stress testing, but lack diversity in traffic generation that one would see in a real-world production environment. Characterizing traffic patterns in such a deployment is non-trivial. Understanding the ever-changing, non-deterministic nature of traffic is of paramount importance in making the application robust. Today's network traffic generators have configurable parameters that include initial traffic load, ramp-up, and ramp-down for a given set of connections/users. In order to emulate real-world network traffic patterns, these parameters need to be experimented with and tweaked constantly. This is not only time consuming but also arduous to scale for multiple applications. As such, improved mechanisms for simulating real-world traffic patterns would be beneficial.

BRIEF SUMMARY

Some embodiments provide a method for generating a test traffic configuration for testing a first network (e.g., a test network hosting a new release or a testing deployment for an application) based on replicating traffic patterns of a second network (e.g., a network hosting a real-world production deployment of the application). Specifically, some embodiments receive a set of data streams representing data traffic observed in the second network, use a learning engine to analyze these data streams to determine the traffic patterns of the second network, and generate the test traffic configuration to replicate these determined traffic patterns. The test traffic configuration is provided to a test traffic generation system that tests the first network by generating data traffic replicating that observed in the second network.

The test traffic configuration is generated, in some embodiments, by a traffic profiler that includes a machine learning engine. The traffic profiler uses the machine learning engine to replicate the traffic patterns of the second network and provides the test traffic configuration to a test traffic controller which either operates in the first network or a network that connects to the first network. The test traffic controller configures a set of test traffic sources (again, either in the first network or a network that connects to the first network) to generate the test traffic according to the test traffic configuration, thereby replicating the real-world conditions observed in the second network. These test traffic sources generate and send test traffic to the application deployment being tested, thereby enabling the application deployment to be tested with a simulation of real-world traffic. In different embodiments, the test traffic sources send this traffic either directly to the application or to a device or set of devices (e.g., load balancer(s), gateway(s), or other devices that handle traffic from outside sources directed to the application).

In some embodiments, the traffic profiler receives the set of data streams representing data traffic observed in the second network from one or more devices in the second network, such as a load balancer, gateway, etc. that processes data traffic from outside devices (e.g., client devices such as laptop/desktop computers, mobile devices, etc.) that connect to the application in the second network. These data streams may arrive in different formats from the second network (e.g., s-flow, IPFIX, PCAP files, netflow, etc.), and may include different types of data (e.g., requests per second, connections per second, cookies, source and destination addresses for specific packets/connections, network characteristics such as latency, jitter, and packet loss, protocol-specific parameters, application-specific information, etc.). In some embodiments, the traffic profiler includes a traffic data translator that translates these disparate formats into a common format for the learning engine (e.g., using JSON, XML, YAML, etc.). In addition, the translator of some embodiments removes personally identifiable information as needed.

Typically, especially when the application deployment in the second network is at or near full traffic load, not all of the traffic can be reported to the traffic profiler. That is, only a subset of the traffic is typically sampled, though additional data such as connections/requests per second can also provide information about the traffic observed at the second network. The traffic profiler (e.g., the learning engine of the traffic profiler) also uses various techniques to approximate the lost data, thereby recovering a fuller picture of the observed traffic at the second network.

Using this data, the learning engine applies various machine learning techniques to the data in order to determine the traffic patterns at the second network. Specifically, in some embodiments, the learning engine reduces the dimensionality (e.g., using a principal component analysis algorithm based on singular value decomposition) of the data, then applies a clustering algorithm to determine profiles of traffic over time. Based on these clustering patterns, the traffic profiler generates the test traffic configuration for the test traffic generation system to use.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a method for generating a test traffic configuration for testing a first network (e.g., a test network hosting a new release or a testing deployment for an application) based on replicating traffic patterns of a second network (e.g., a network hosting a real-world production deployment of the application). Specifically, some embodiments receive a set of data streams representing data traffic observed in the second network, use a learning engine to analyze these data streams to determine the traffic patterns of the second network, and generate the test traffic configuration to replicate these determined traffic patterns. The test traffic configuration is provided to a test traffic generation system that tests the first network by generating data traffic replicating that observed in the second network.

Figure 1:
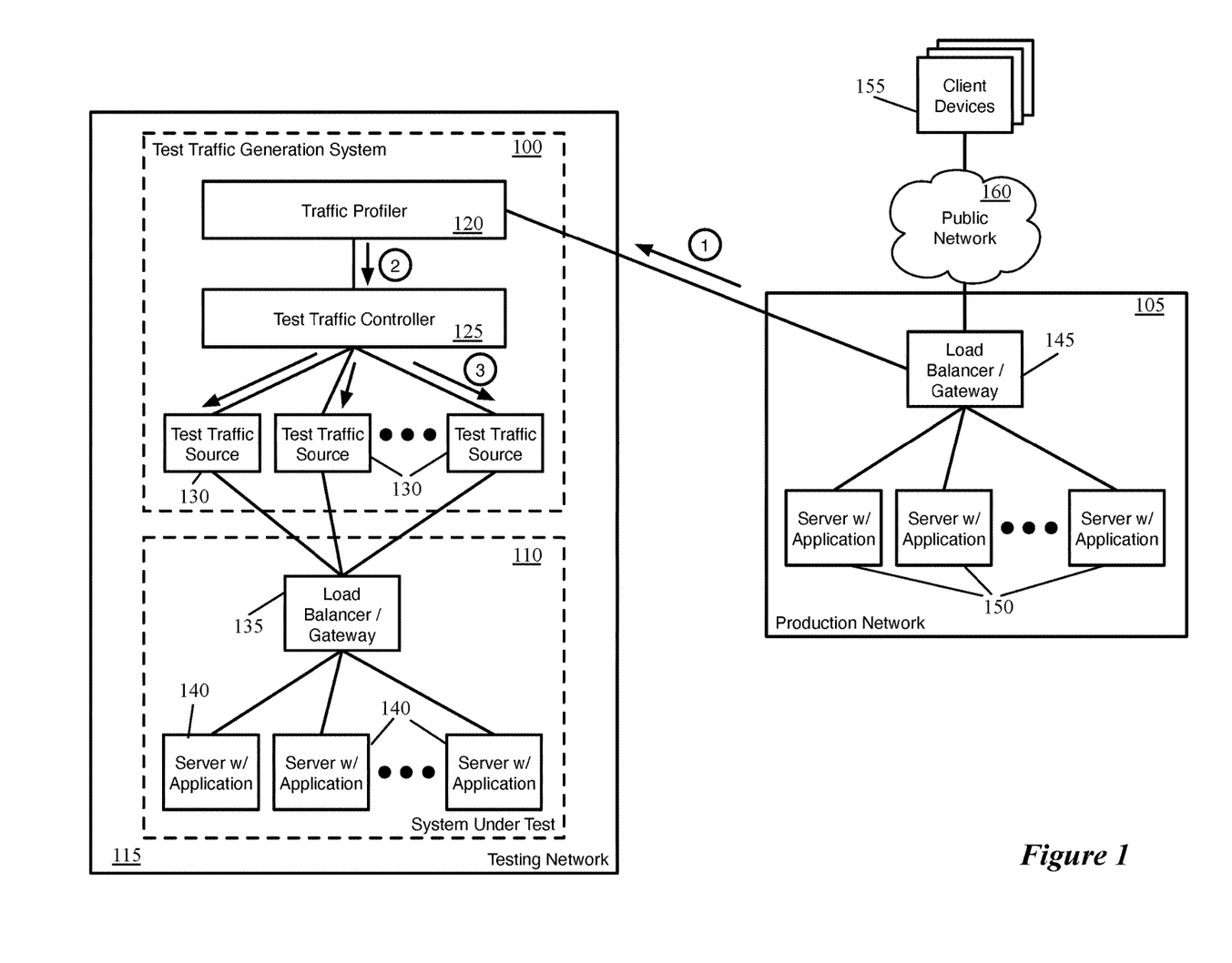
FIG. 1 conceptually illustrates a test traffic generation system that generates a test traffic configuration based on traffic patterns observed in a production network and generates traffic based on these traffic patterns in order to test another system.

FIG. 1 conceptually illustrates a test traffic generation system 100 that generates a test traffic configuration based on traffic patterns observed in a production network 105 and generates traffic based on these traffic patterns in order to test a system 110. In this example, the test traffic generation system 100 executes in a testing network 115 along with the system 110 being tested. However, it should be understood that in different embodiments the test traffic generation system 100, or at least part of that system, could be located in a different network.

As shown, the test traffic generation system 100 includes a traffic profiler 120, a test traffic controller 125, and a set of test traffic sources 130. The traffic profiler 120 of some embodiments, described in further detail below by reference to FIGS. 2 and 3, uses a machine learning engine to replicate the traffic patterns observed in the production network 105 based on data sent from that production network. The traffic profiler generates a test traffic configuration for the testing system 100 and provides this to the test traffic controller 125

The test traffic controller 125 configures the various test traffic sources 130 to generate test traffic according to the test traffic configuration, thereby replicating the real-world conditions observed in the production network 105. In some embodiments, the test traffic controller provides an interface or other mechanism (e.g., a REST application programming interface (API), command line interface (CLI), graphical user interface (GUI), etc.) for configuration management and traffic monitoring. This interface is accessible to users (e.g., a network admin, application developer testing an application, etc.) as well as to the traffic profiler 120 in some embodiments, enabling the administrator to configure, monitor, and manage the configuration of test traffic sources as well as the operation of the traffic profiler 120 and its data source(s) in the production network 105. In some embodiments, the test traffic controller operates as an endpoint for aggregated metrics and statistics reporting, enabling a user to monitor the performance of the system 110 being tested.

The test traffic sources 130 generate and send test traffic to the system 110 being tested, thereby enabling the system 110 to be tested with a simulation of real-world traffic. In some embodiments, the entire life cycle of the test traffic sources 130 is managed by the test traffic controller 125; that is, the test traffic controller 125 configures the test traffic sources 130 to stop and start as per the test traffic configuration and can change the test traffic configuration for each of the test traffic sources as needed. The number of test traffic sources 130 can vary based on the test traffic configuration, with the test traffic controller 125 responsible for dynamically scaling the number of test traffic sources 130 operating at any given time (e.g., if needed to achieve higher throughput or numbers of connections/requests per second). In addition to generating traffic that is sent to the system 110 being tested, in some embodiments the test traffic sources 130 send real time telemetry collected across various target applications to the test traffic controller 125, in order for the controller 125 to analyze these metrics.

The test traffic sources 130, in some embodiments, can generate and send traffic with parameters specified for many protocols across the entire network stack from layer 2 to layer 7. This includes parameters for various layer 4 protocols such as TCP and UDP, parameters for various layer 7 protocols such as HTTP/HTTPS 1.x and 2.0, and security parameters for SSL/TLS. In addition, these test traffic sources 130 can emulate a real-world browser with persistence validation using cookies and/or SSL session identifiers. If needed, the test traffic sources 130 of some embodiments are able to emulate distributed denial of service (DDoS) traffic in order to test application firewalls.

In some embodiments, the test traffic controller 125 and the test traffic sources 130 are implemented within containers or virtual machines executing on host computers in the testing network 115. The test traffic controller 125 can be implemented by a single container or distributed across multiple containers (e.g., as a cluster of controllers). The test traffic sources 130 are each implemented on a separate container in some embodiments. These separate containers may execute on the same host computer or various different host computers in the testing network 115; in some embodiments, multiple test traffic sources 130 might be implemented on containers that execute in the same virtual machine (VM). In addition, the test traffic controller 125 might be implemented on a container that executes on the same host computer or even the same VM as one or multiple test traffic sources 130.

The test traffic sources 130 send traffic directed to the system 110 being tested. In some embodiments, an application (e.g., a distributed application) that receives and handles traffic from external clients is deployed in the testing network 115. The application being tested might be a new release of an existing application, a currently released application that is experiencing issues in the field, a new application being prepared for deployment, etc. In some embodiments, the system 110 includes a gateway device 135, which may operate as a gateway router, load balancer, firewall, etc., depending on the requirements of the application and the network at which the application will be deployed.

Located behind this gateway device 135 are a set of servers 140 on which the application being tested is deployed. These servers 140 represent the various containers, virtual machines, etc. on which various application components are deployed. For instance, many application deployments entail multiple microservices executing on separate containers that combine to implement an application. Though not shown in the figure, these services may be arranged in tiers (e.g., a web tier, application tier, and database tier, as is common for a web-accessible application). In some such embodiments, only one of the tiers (e.g., the web tier) is directly reached through the gateway device 135 by the traffic sent from the test traffic sources 130, while the other tiers are located behind the web tier.

FIG. 1 also illustrates a production network 105. As shown, this network also includes a gateway device 145 and a set of servers 150 on which the deployed application executes. Like for the system 110 being tested, this gateway device 145 may operate as a gateway router, load balancer, firewall, etc., depending on the requirements of the application and the production network 105. In addition, the gateway device 145 is configured in some embodiments to monitor traffic received from the public network 160 (and/or sent to the public network 160) and export traffic data summarizing this received traffic. It should be noted that while this example shows an application that receives traffic from client devices 155 through a public network 160, in other examples the application might only interact with clients on private networks (e.g., operating in the same datacenter as the application or operating in a different datacenter and connected via VPN to the application).

The application operating in the production network 105 is an application currently operating and receiving real-world traffic (e.g., from client devices 155 via a public network 160). In some embodiments, the application deployed in the production network 105 is implemented in the same manner as the application under test. That is, the application under test is designed to match the implementation of the application operating in the production network 105 in some embodiments (e.g., the same microservices operating in the same number of containers and/or VMs, the same tiers, etc.). In other embodiments, the application under test may differ from the production network application (e.g., if the application under test is a new release of the application that differs in certain ways in its implementation).

The operation of the test traffic generation system 100 will now be described. As shown by the encircled 1, the gateway device 145 (or another device at the production network that monitors traffic) exports observed traffic data to the traffic profiler 120. It should be noted that while shown as a single device 145, in some embodiments the application might be deployed in such a way that multiple gateway, load balancer, firewall, etc. devices receive application traffic from the public network 160. For instance, the application might be a large deployment in a single network that requires multiple active gateways or load balancers, or might even be deployed across multiple datacenters for redundancy.

In some embodiments, different types of load balancer or gateway devices provide this traffic data to the traffic profiler in different formats, and if the application deployment requires multiple gateway devices these devices might use different formats for the export of traffic data. The traffic data arrives in some embodiments as data streams in various formats such as s-flow, IPFIX, PCAP files, netflow, etc. The traffic data of some embodiments can include different types of data such as requests per second, connections per second, cookies, source and destination addresses for specific packets/connections, etc. In some embodiments, the traffic profiler 120 includes a traffic data translator that translates these disparate formats into a common format and removes personally identifiable information as needed. The traffic profiler 120 includes a learning engine as well, in some embodiments, which analyzes the normalized traffic data to generate a test traffic configuration that matches the traffic patterns observed in the received traffic data. As mentioned, the operations of the traffic profiler are described in greater detail below by reference to FIGS. 2 and 3.

As shown by the encircled 2, the traffic profiler 120 provides this generated test traffic configuration to the test traffic controller 125 (e.g., via the REST API of the controller 125). The test traffic controller 125 receives the test traffic configuration and uses this to configure the test traffic sources 130, as shown by the encircled 3. Because the test traffic configuration is based on machine learning analysis of the actual data traffic, the test traffic sources 130 generate and send to the system 100 being tested traffic that replicates real-world conditions, so as to better test the application deployed in the testing network 115.

Figure 2:
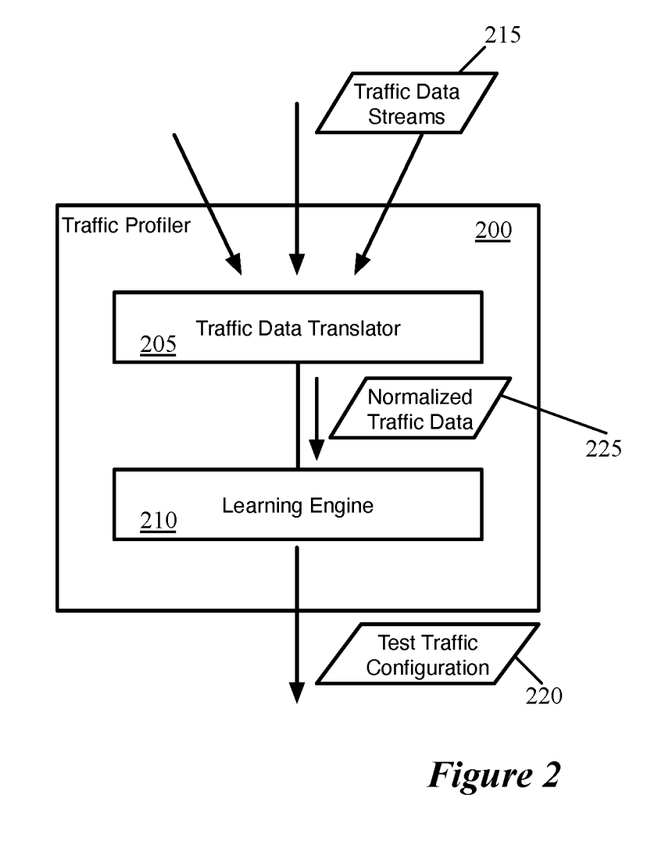
FIG. 2 conceptually illustrates the architecture of a traffic profiler of some embodiments.

As mentioned, FIG. 2 conceptually illustrates the architecture of a traffic profiler 200 of some embodiments in greater detail. As shown, the traffic profiler 200 includes a traffic data translator 205 and a learning engine 210. The traffic profiler 200 receives traffic data streams 215 from one or more devices (e.g., gateways, load balancers, firewalls, etc.) that monitor real-world traffic from a production network and outputs a test traffic configuration 220 generated to match the traffic patterns observed in the production network.

The traffic data translator 205 translates the received traffic data streams 215 into normalized traffic data 225, also referred to as traffic data tokens. The traffic data streams 215 can be received from various different types of gateway devices and in various different formats, while the learning engine 210 is designed to process data in a particular format. Thus, the traffic data translator 205 of some embodiments includes various different data handlers for the different possible traffic data formats. In some embodiments, the data handlers are user-defined interfaces for receiving and translating specific formats of data. In some embodiments, the traffic data translator 205 is extensible such that additional data handlers can be defined for new traffic data formats, so that the traffic profiler can generate traffic profiles from any type of traffic data stream.

These data handlers might receive PCAP files, gRPC calls, message queues, XML/JSON/Protobuf streams, syslogs, netflows, IPFIX data, etc., with different environments providing different types of data. Different formats of traffic data streams 215 may include different types of data, including requests per second, connections per second, cookies, source and destination addresses for specific packets/connections, etc.

The traffic data translator 205 provides the normalized traffic data 225 to the learning engine 210, which processes the normalized traffic data 225 to generate a test traffic configuration 220 which is intended to replicate real-world traffic patterns. As described above, the test traffic configuration 220 is used by the test traffic controller to configure test traffic sources to generate traffic. In some embodiments, the traffic profiler 200 can also be configured to generate a test traffic configuration for other testing systems (e.g., other traffic generators).

In some embodiments, the learning engine 210 performs a number of successive operations to generate the test traffic configuration based on real-world traffic patterns. Typically, especially when the deployed application in the production network is receiving large amounts of traffic (the sort of condition that should be replicated accurately in the test traffic patterns), not all of the traffic can be reported to the traffic profiler. That is, only a subset of the traffic is typically sampled by the gateway device (or monitoring device that monitors traffic at the gateway device), though additional data such as connections/requests per second can also provide information about the traffic observed at the second network. The learning engine 210 uses various techniques to approximate the lost data, thereby recovering a fuller picture of the observed traffic at the second network. Using this data, the learning engine 210 applies various machine learning techniques to the data in order to determine the traffic patterns seen at the production network. Specifically, in some embodiments, the learning engine 210 reduces the dimensionality (e.g., using a principal component analysis algorithm based on singular value decomposition) of the data, then applies a clustering algorithm to determine clusters of traffic over time. Based on these clustering patterns, the learning engine 210 can generate the test traffic configuration for the test traffic generation system to use.

Figure 3:
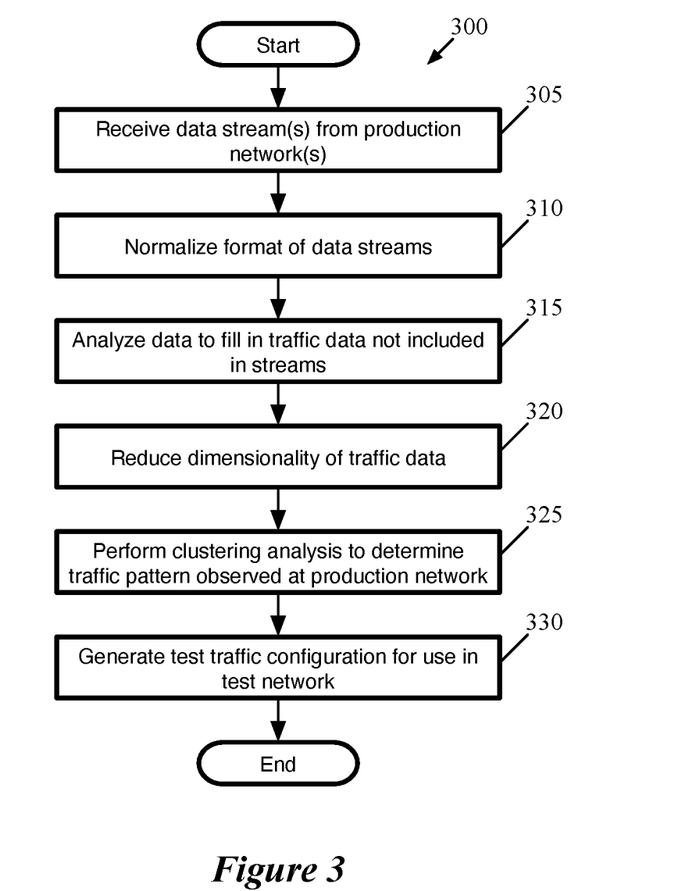
FIG. 3 conceptually illustrates a process of some embodiments for generating a test traffic configuration.

FIG. 3 conceptually illustrates a process 300 of some embodiments for generating a test traffic configuration. In some embodiments, the process 300 is performed by a traffic profiler (e.g., the traffic profiler 200), primarily by the learning engine. This process uses traffic data streams from one or more real-world sources to generate a test traffic configuration that replicates the traffic patterns seen in a production network.

As shown, the process 300 begins by receiving (at 305) one or more data streams from one or more production networks. As described above, these data streams might be received from various different types of gateway devices and in various different formats (e.g., PCAP files, gRPC calls, message queues, XML/JSON/Protobuf streams, syslogs, netflows, IPFIX data, etc.). For a particular application deployment, the traffic profiler will often receive only a single format of traffic data, unless multiple different types of gateway and/or monitoring devices are used in the production network. However, the same traffic profiler might be used to generate test traffic configurations for a variety of different testing setups, and therefore could be configured to handle various different data stream formats.

Next, the process 300 normalizes (at 310) the format of the received data streams. In some embodiments, the traffic profiler (e.g., a traffic data translator module) includes numerous data handlers for translating the various different types of data that could be received into a normalized format recognized by the learning engine. This normalized format can be represented in JSON, XML, YAML, or other such format for specifying normalized data segments (also referred to as "tokens").

In some embodiments, the normalized data segments include information specific to packets or data flows, such as the specific protocols used for each layer. As examples, the specific header fields present in a packet or flow (and/or the values for these packets) could be specified, including the Ethernet fields present, some or all of the IP fields present, the TCP and/or UDP fields present, the HTTP(S) fields present, etc. In addition, some embodiments specify cookies, protocol versions, L7 data such as URLs, packet length, etc. The normalized data segments can also include network characteristics (e.g., latency, jitter, packet loss, etc.) if that information is received by the traffic profiler in a data stream. In addition, application-specific data (e.g., payload size, patterns, amounts of data in different directions, etc.) can also be included in these data segments.

The learning engine performs various operations on the normalized data to generate a test traffic configuration that matches the traffic patterns observed in the real-world production network setting. It should be noted that, while the process 300 is illustrated as a linear process, this is a conceptual process. In some embodiments, the traffic profiler regularly receives traffic data streams and normalizes this data. At periodic intervals (e.g., based on regular time intervals, receipt of a threshold amount of traffic data, etc.), the learning engine performs its operations to determine patterns in the traffic data. This periodic analysis by the learning engine helps to minimize computation and memory overhead in the traffic profiler.

As shown, the process 300 analyzes (at 305) the received normalized data to fill in traffic data not included in the streams. Especially when the production network deployment of an application is at or near its full traffic load, the data stream(s) from the gateway device(s) at that network will not include information about every packet received for the application. Instead, many traffic monitoring devices sample the data packets received at the device and report traffic data based on these samples, which should be representative of the entirety of the traffic seen at the device. The learning engine of some embodiments tries to recover the missing information by, e.g., using techniques of multivariate solvers that treat the information in the data stream as a matrix. Some such embodiments transform this matrix into a row-echelon form and solve for the unknown data. If the equations are consistent, this technique yields approximated optimal values for the missing data. Some embodiments use Cholesky decomposition and convex optimization techniques for this purpose.

As a simplistic example, data from a gateway device might include information about three types of traffic. The first type includes m cookies, n headers, and has a size of a bytes, with a relative ratio in the data streams of A (compared to other types of traffic). The second type includes o cookies, p headers, and has a size of b bytes, with a relative ratio in the data streams of B. The third type of data includes q cookies, r headers, and has a size of c bytes, with a relative ratio in the data streams of C. From this the traffic profiler can conclude that $xA+yB+zC=$(requests per second)*(time interval) and that $xaA+ybB+zcC=$(throughput)*(time interval). Solving for these equations enables the traffic profiler to determine the amount of each type of traffic received during the time interval, thereby approximating the missing traffic data.

Next, the process reduces (at 320) the dimensionality of the traffic data. The normalized traffic data includes information across a number of dimensions, and the learning engine of some embodiments determines the optimal number of dimensions to which this information can be reduced and performs this dimension-reduction operation. In some embodiments, the learning engine uses principal component analysis (PCA) to reduce the dimensionality of the traffic data by determining which information in the traffic data is important and which information is noise.

Specifically, some embodiments use a PCA function that takes as input the target dimensionality for the traffic data and a solver algorithm. To determine the target dimensionality, some embodiments use maximum likelihood estimation (MLE). For the solver algorithm, some embodiments use a singular value decomposition (SVD) implementation. Reducing the dimensionality of the traffic data using such a method helps to minimize computational and memory overhead without a loss of information, and can even improve the learning engine output by reducing an overfitting effect resulting from having too many dimensions.

As an example, the traffic data before dimensionality reduction could include n dimensions such as headers, cookies, HTTP version, TLS version, query parameters, URL, packet body length, requests per second, connections per second, and throughput (and potentially different, fewer, or more parameters). Rather than using each of these dimensions as a separate dimension for learning, some embodiments define a principal dimension that is used to avoid overfitting. In some embodiments, the principal dimensions does not correspond to a single definable parameter (such as headers, cookies, etc.), but rather to a combination of these parameters.

In some such embodiments, this combination is determined by identifying related parameters in the traffic data, associating entropy factors with the dimensions, and deriving a single parameter representing these related parameters. As an example, a sample set of traffic data might include seven dimensions a, b, c, d, e, g, and h, with parameters a, b, and c related (and therefore candidates for reduction). The dimension reduction operation associated entropy factors e1, e2, and e3 with parameters a, b, and c respectively. A new dimension m is defined such that m=f(e1*a, e2*b, e3*c). Thus, the new set of traffic data has five dimensions m, d, e, g, and h (and this set can be further reduced).

The process then performs (at 325) clustering analysis to determine the traffic pattern observed at the production network(s). Because the traffic data has a high volume of data and is often repetitive across time, this data can be clustered together for a concise representation of the observed traffic. Some embodiments use density-based spatial clustering of application and noise (DBSCAN), which is a time-series clustering algorithm that is resilient towards outlier data. The DBSCAN algorithm takes as parameters (i) a number of data points in the neighborhood of a particular data point in order for that data point to be considered as a core data point and (ii) the maximum distance between two data points for one data point to be considered in the neighborhood of another data point. Based on the values for these parameters, the clustering algorithm of some embodiments finds all of the pairs of neighbor data points within the set maximum distance of each other to identify the core data points with the requisite number of neighbor data points. For each core data point, the algorithm creates a new cluster if that core data point is not already assigned to a cluster (multiple data points in the same cluster might satisfy the requirements to be core data points). The clustering algorithm then, for each core data point, recursively finds all of the densely connected data points and assigns these to the same cluster as the core data point. This algorithm of some embodiments iterates through the data points until all data points are evaluated.

To determine the optimal value of the maximum distance between two data points in the above clustering algorithm (i.e., the size of each data point's neighborhood), some embodiments use a nearest neighbors algorithm that is a neighbor searcher. This algorithm calculates, for each data point, the distance to the nearest X number of points and sorts the data points based on this calculation. The point at which the change in the distance between data points is the largest is used for the optimal value of the maximum distance of the neighborhood in the clustering algorithm. Some embodiments use the number of dimensions of the reduced-dimension traffic data (or the number of dimensions+1) as the value of X in the nearest neighbors algorithm.

Based on the clustering analysis, the process 300 generates (at 330) a test traffic configuration for the test traffic generation system to use in the test network. In some embodiments, the periodic analysis performed by the learning engine results in a single cluster pattern being separate across multiple analysis timeframes. Some embodiments compare clusters across multiple consecutive timeframes, with traffic clusters that span these timeframes stitched together with each other. In some embodiments, the test traffic configuration is output as a time-series traffic representation. This configuration includes information specifying when to start, stop, and update traffic patterns learned from the clustering algorithm.

Figure 4:
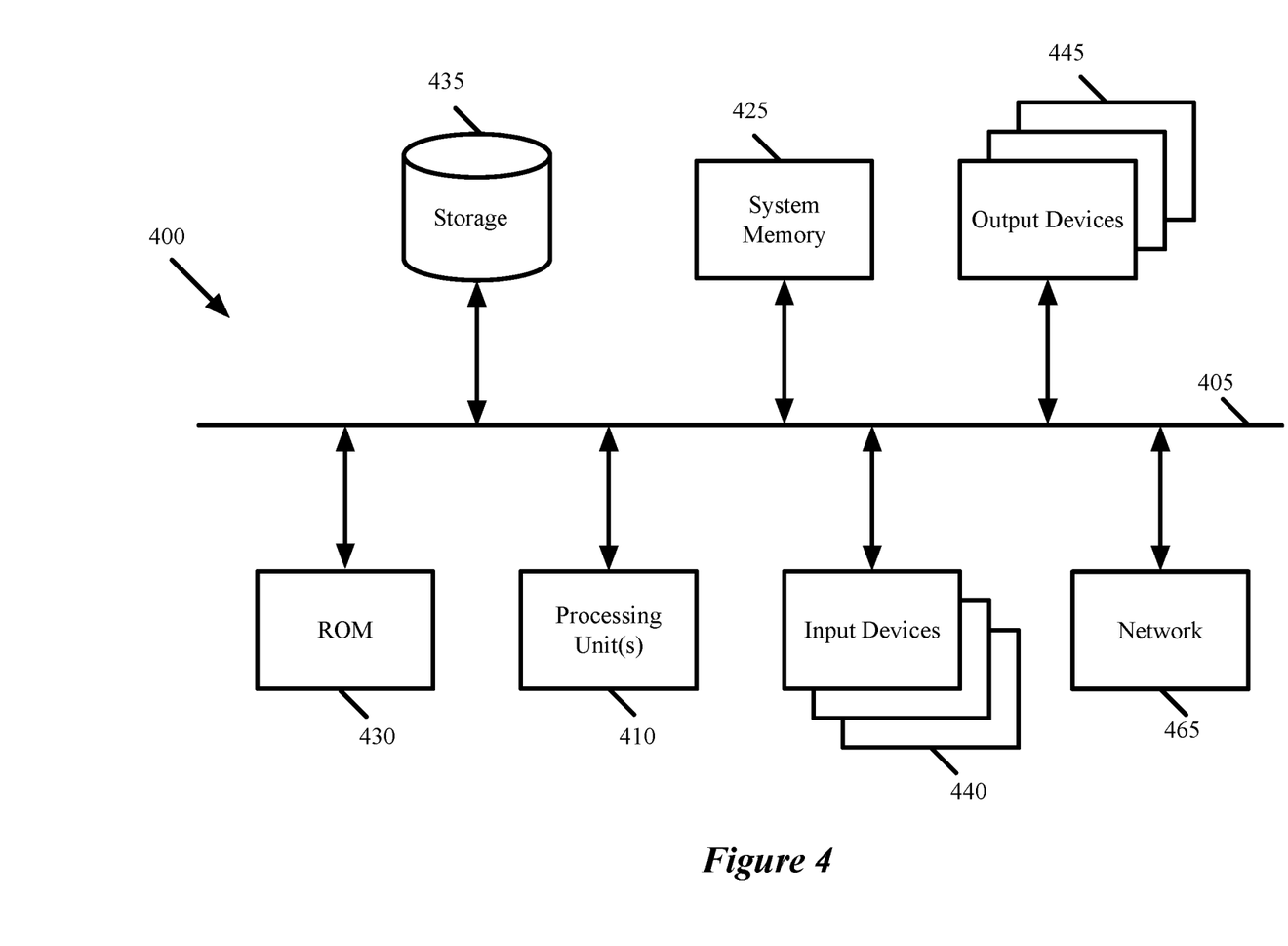
FIG. 4 conceptually illustrates an electronic system with which some embodiments of the invention are implemented.

FIG. 4 conceptually illustrates an electronic system 400 with which some embodiments of the invention are implemented. The electronic system 400 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 400 includes a bus 405, processing unit(s) 410, a system memory 425, a read-only memory 430, a permanent storage device 435, input devices 440, and output devices 445.

The bus 405 collectively represents all system, peripheral, and chipset buses that communicatively connect the numerous internal devices of the electronic system 400. For instance, the bus 405 communicatively connects the processing unit(s) 410 with the read-only memory 430, the system memory 425, and the permanent storage device 435.

From these various memory units, the processing unit(s) 410 retrieve instructions to execute and data to process in order to execute the processes of the invention. The processing unit(s) may be a single processor or a multi-core processor in different embodiments.

The read-only-memory (ROM) 430 stores static data and instructions that are needed by the processing unit(s) 410 and other modules of the electronic system. The permanent storage device 435, on the other hand, is a read-and-write memory device. This device is a non-volatile memory unit that stores instructions and data even when the electronic system 400 is off. Some embodiments of the invention use a mass-storage device (such as a magnetic or optical disk and its corresponding disk drive) as the permanent storage device 435.

Other embodiments use a removable storage device (such as a floppy disk, flash drive, etc.) as the permanent storage device. Like the permanent storage device 435, the system memory 425 is a read-and-write memory device. However, unlike storage device 435, the system memory is a volatile read-and-write memory, such a random-access memory. The system memory stores some of the instructions and data that the processor needs at runtime. In some embodiments, the invention's processes are stored in the system memory 425, the permanent storage device 435, and/or the read-only memory 430. From these various memory units, the processing unit(s) 410 retrieve instructions to execute and data to process in order to execute the processes of some embodiments.

The bus 405 also connects to the input and output devices 440 and 445. The input devices enable the user to communicate information and select commands to the electronic system. The input devices 440 include alphanumeric keyboards and pointing devices (also called "cursor control devices"). The output devices 445 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 4, bus 405 also couples electronic system 400 to a network 465 through a network adapter (not shown). In this manner, the computer can be a part of a network of computers (such as a local area network ("LAN"), a wide area network ("WAN"), or an Intranet, or a network of networks, such as the Internet. Any or all components of electronic system 400 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

It should be understood that while the specification refers to VMs, the examples given could be any type of DCNs, including physical hosts, VMs, non-VM containers, and hypervisor kernel network interface modules. In fact, the example networks could include combinations of different types of DCNs in some embodiments.

While the invention has been described with reference to numerous specific details, one of ordinary skill in the art will recognize that the invention can be embodied in other specific forms without departing from the spirit of the invention. In addition, a number of the figures (including FIG. 3) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A method for generating a test traffic configuration for testing a first network, the method comprising:
   from a second network, receiving at least two data streams in two different formats, the data streams representing data traffic observed at one or more devices during a time interval in the second network that is a subset of data traffic processed by the one or more devices during the time interval;
   normalizing the received data streams into a standardized format for consumption by a machine learning engine;
   using the machine learning engine to analyze the set of normalized data streams in order to determine traffic patterns in the second network, wherein the analysis by the machine learning engine comprises:
      based on traffic statistics for the time interval, determining characteristics of additional data traffic processed by the one or more devices during the time interval but not represented in the normalized data streams;

determining an optimal number of dimensions for the normalized data streams with data representing the additional data traffic;

reducing dimensionality of the normalized data streams with the data representing the additional data traffic to the determined optimal number of dimensions; and using the dimension-reduced normalized data streams with the data representing the additional data traffic to determine the traffic patterns in the second network; and generating the test traffic configuration for testing the first network by replicating the traffic patterns of the second network in the first network.

2. The method of claim 1, wherein the second network is a production network with a deployed instance of an application and traffic-processing appliance that receives real-world data traffic.

3. The method of claim 2, wherein the first network is a test network for testing a new release of the application and traffic-processing appliance.

4. The method of claim 2, wherein the first network is a test network for testing another instance of the application and traffic-processing appliance.

5. The method of claim 1, wherein determining the characteristics of the additional data traffic comprises using approximated optimal values to represent the additional data traffic.

6. The method of claim 1, wherein reducing dimensionality of the normalized data streams with the data representing the additional data traffic comprises using a principal component analysis function.

7. The method of claim 1, wherein using the dimension-reduced normalized data streams with the data representing the additional data traffic to determine the traffic patterns in the second network comprises using a clustering algorithm to determine the traffic patterns in the second network.

8. The method of claim 1 further comprising providing the generated test traffic configuration to a testing controller, wherein the testing controller uses the test traffic configuration to configure a set of test traffic sources.

9. The method of claim 8, wherein the test traffic sources are network endpoints in the first network that generate data traffic to match the traffic patterns of the second network based on the test traffic configuration.

10. The method of claim 8, wherein the testing controller and the set of test traffic sources are data compute nodes deployed in the first network.

11. The method of claim 1, wherein at least a subset of the data streams are received from a set of network devices of the second network.

12. A non-transitory machine-readable medium storing a program which when executed by at least one processing unit generates a test traffic configuration for testing a first network, the program comprising sets of instructions for:

from a second network, receiving at least two data streams in two different formats, the data streams representing data traffic observed at one or more devices during a time interval in the second network that is a subset of data traffic processed by the one or more devices during the time interval;

normalizing the received data streams into a standardized format for consumption by a machine learning engine;

using the machine learning engine to analyze the set of normalized data streams in order to determine traffic patterns in the second network, wherein the analysis by the machine learning engine comprises:

based on traffic statistics for the time interval, determining characteristics of additional data traffic processed by the one or more devices during the time interval but not represented in the normalized data streams;

determining an optimal number of dimensions for the normalized data streams with data representing the additional data traffic;

reducing dimensionality of the normalized data streams with the data representing the additional data traffic to the determined optimal number of dimensions; and using the dimension-reduced normalized data streams with the data representing the additional data traffic to determine the traffic patterns in the second network; and generating the test traffic configuration for testing the first network by replicating the traffic patterns of the second network in the first network.

13. The non-transitory machine-readable medium of claim 12, wherein:

the second network is a production network with a deployed instance of an application and traffic-processing appliance that receives real-world data traffic; and the first network is a test network for testing the application and traffic-processing appliance.

14. The non-transitory machine-readable medium of claim 12, wherein determining the characteristics of the additional data traffic comprises using approximated optimal values for the additional data traffic.

15. The non-transitory machine-readable medium of claim 12, wherein the program further comprises a set of instructions for providing the generated test traffic configuration to a testing controller, wherein the testing controller uses the test traffic configuration to configure a set of network endpoints in the first network that generate data traffic to match the traffic patterns of the second network based on the test traffic configuration.

16. The method of claim 1, wherein:

the normalized data streams comprise a set of parameters, each parameter corresponding to a definable parameter of the data traffic represented by the normalized data streams; and after dimensionality of the normalized data streams with the data representing the additional data traffic is reduced, at least one resulting dimension corresponds to a combination of the parameters.

17. The method of claim 1, wherein determining an optimal number of dimensions for the normalized data streams with data representing the additional data traffic comprises using maximum likelihood estimation.

18. The method of claim 1, wherein reducing the dimensionality of the normalized data streams with data representing the additional data traffic avoids overfitting by the machine learning engine.

19. The non-transitory machine-readable medium of claim 12, wherein using the dimension-reduced normalized data streams with the data representing the additional data traffic to determine the traffic patterns in the second network comprises using a clustering algorithm to determine the traffic patterns in the second network.

20. The non-transitory machine-readable medium of claim 12, wherein:

the normalized data streams comprise a set of parameters, each parameter corresponding to a definable parameter of the data traffic represented by the normalized data streams; and after dimensionality of the normalized data streams with the data representing the additional data traffic is reduced, at least one resulting dimension corresponds to a combination of the parameters.

* * * * *